(12) United States Patent
Blair et al.

(10) Patent No.: US 12,214,707 B2
(45) Date of Patent: Feb. 4, 2025

(54) SEAT ASSEMBLY WITH MASSAGE

(71) Applicant: Lear Corporation, Southfield, MI (US)

(72) Inventors: Samuel Blair, Troy, MI (US); David Abdella, Royal Oak, MI (US); Joshua Hallock, Warren, MI (US)

(73) Assignee: Lear Corporation, Southfield, MI (US)

( * ) Notice: Subject to any disclaimer, the term of this patent is extended or adjusted under 35 U.S.C. 154(b) by 190 days.

(21) Appl. No.: 17/706,744

(22) Filed: Mar. 29, 2022

(65) Prior Publication Data

US 2023/0311734 A1 Oct. 5, 2023

(51) Int. Cl.
*B60N 2/90* (2018.01)
*A61H 9/00* (2006.01)

(52) U.S. Cl.
CPC .......... *B60N 2/976* (2018.02); *A61H 9/0071* (2013.01); *A61H 2201/1246* (2013.01)

(58) Field of Classification Search
CPC ....... B60N 2/976; A61H 9/0078; A61H 9/005
See application file for complete search history.

(56) References Cited

U.S. PATENT DOCUMENTS

| | | | | |
|---|---|---|---|---|
| 7,311,681 B1 * | 12/2007 | Vaccarella | ......... | A61H 23/0263 601/49 |
| 9,849,058 B2 * | 12/2017 | Boyer | ................ | A61H 9/0057 |
| 11,358,553 B1 * | 6/2022 | Kurematsu | ............ | B60R 21/207 |
| 2006/0217644 A1 * | 9/2006 | Ozaki | ................. | A61H 9/0078 601/150 |
| 2007/0239090 A1 * | 10/2007 | Mitea | ................. | A61H 15/0078 601/103 |
| 2010/0244504 A1 * | 9/2010 | Colja | ................... | A61H 9/0078 297/284.6 |
| 2018/0170230 A1 * | 6/2018 | Onuma | ................... | F04B 43/00 |
| 2019/0353184 A1 * | 11/2019 | Uno | ..................... | B60N 2/5657 |
| 2022/0040034 A1 * | 2/2022 | Son | ........................ | F16H 37/124 |
| 2023/0191973 A1 * | 6/2023 | Migneco | ................ | B60N 2/976 601/148 |
| 2023/0311727 A1 * | 10/2023 | Hallock | ............... | F04B 45/043 454/307 |
| 2023/0322140 A1 * | 10/2023 | Fitzpatrick | ............. | B60N 2/976 297/217.3 |
| 2023/0355462 A1 * | 11/2023 | Ghanime | ................. | A47C 7/40 |

(Continued)

FOREIGN PATENT DOCUMENTS

| | | | | |
|---|---|---|---|---|
| CN | 107753195 A | * | 3/2018 | |
| CN | 208064874 U | * | 11/2018 | ............. A47C 1/027 |
| CN | 209899973 U | * | 1/2020 | |

(Continued)

*Primary Examiner* — Timothy J Brindley
(74) *Attorney, Agent, or Firm* — Carlson, Gaskey & Olds, P.C.

(57) ABSTRACT

A seat assembly is provided with a seat frame and a seat support. A plurality of linear actuators or a camshaft are supported on the frame and oriented toward the seat support surface to each provide a localized percussive massage upon the seated occupant. Alternatively, a guide is supported upon the seat frame. A plurality of massage plates is provided on the guide. A plurality of massage nodes is each provided on one of the plurality of massage plates so that compression upon each massage plate flexes a region of each massage plate to extend each massage node forward to provide a localized massage upon the seated occupant.

15 Claims, 3 Drawing Sheets

(56) References Cited

U.S. PATENT DOCUMENTS

| | | | | |
|---|---|---|---|---|
| 2023/0382283 | A1* | 11/2023 | Dörfler | B60N 2/976 |
| 2023/0415692 | A1* | 12/2023 | Rao | B60N 2/42763 |

FOREIGN PATENT DOCUMENTS

| | | | | | |
|---|---|---|---|---|---|
| CN | 113085687 | A | * | 7/2021 | B60N 2/976 |
| CN | 215190526 | U | * | 12/2021 | |
| CN | 114084052 | A | * | 2/2022 | |
| CN | 114587955 | A | * | 6/2022 | |
| CN | 114947439 | A | * | 8/2022 | |
| CN | 115054497 | A | * | 9/2022 | |
| CN | 115230549 | A | * | 10/2022 | A61H 1/005 |
| CN | 115230550 | A | * | 10/2022 | A61H 23/02 |
| CN | 115339365 | A | * | 11/2022 | B60N 2/22 |
| CN | 115444728 | A | * | 12/2022 | |
| DE | 4431586 | A1 | * | 3/1996 | B60N 2/448 |
| DE | 102013107811 | A1 | * | 1/2015 | A47C 31/126 |
| DE | 102017214313 | A1 | * | 2/2019 | B60N 2/5685 |
| JP | 2006273206 | A | * | 10/2006 | A61H 9/0078 |
| KR | 20230002131 | U | * | 11/2023 | |
| WO | WO-2016167613 | A1 | * | 10/2016 | A47G 9/10 |
| WO | WO-2023158568 | A1 | * | 8/2023 | B60N 2/976 |

\* cited by examiner

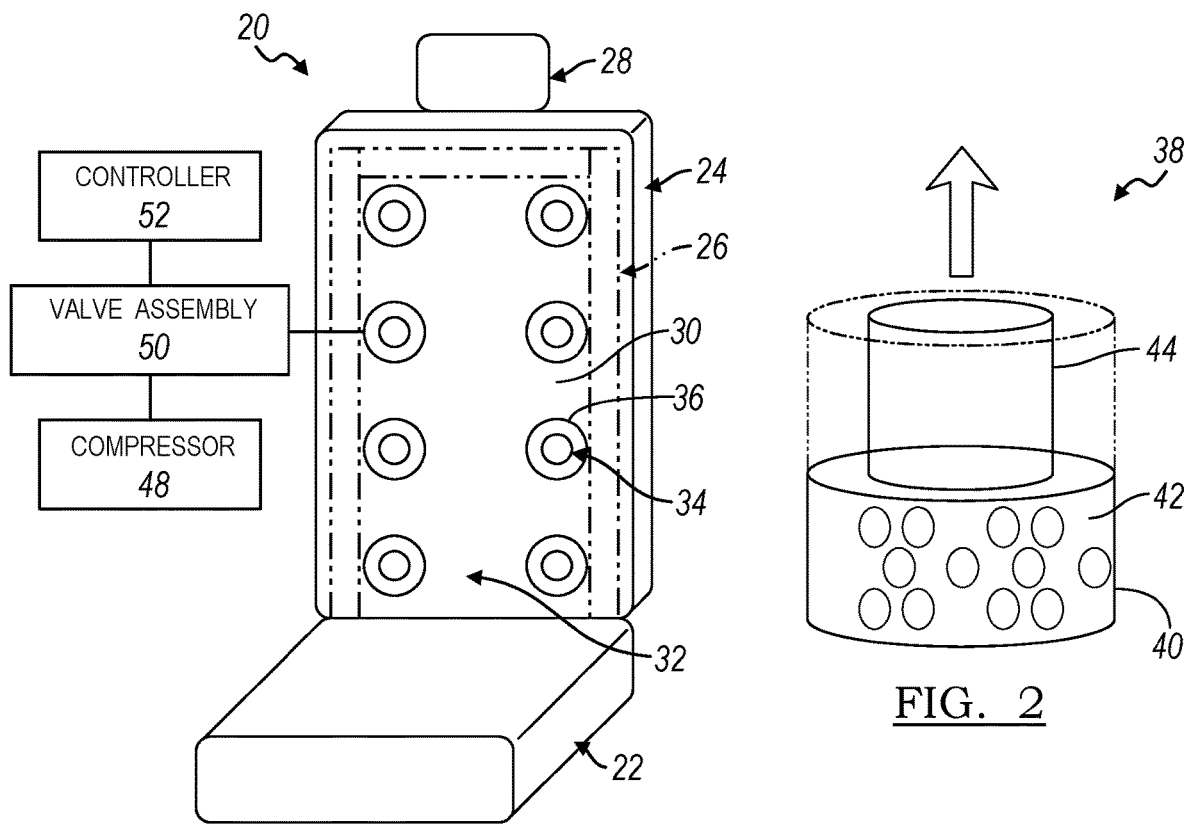
FIG. 1
FIG. 2
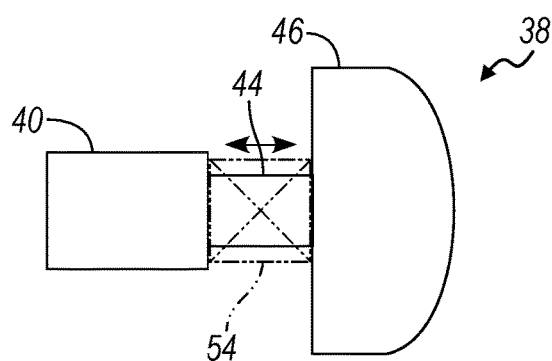
FIG. 3
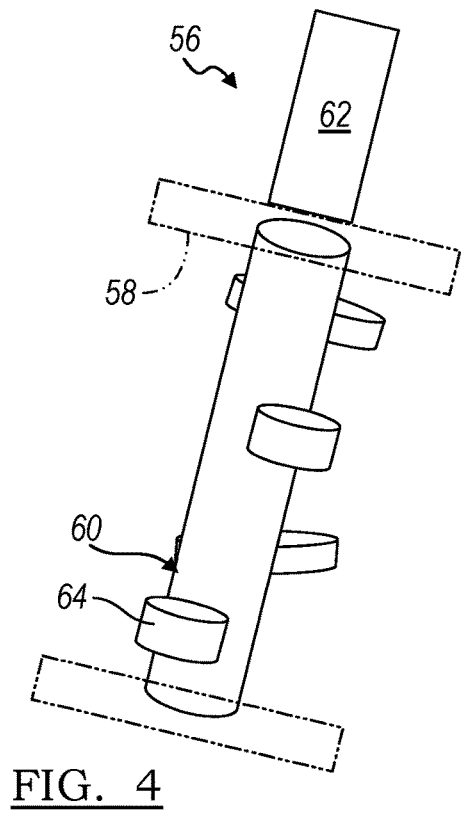
FIG. 4

SEAT ASSEMBLY WITH MASSAGE

TECHNICAL FIELD

Various embodiments relate to seat assemblies with massage features.

BACKGROUND

The prior art has provided vehicle seats with air bladder assemblies to provide pneumatic massage to an occupant.

SUMMARY

According to an embodiment, a seat assembly is provided with a seat frame. A seat support with a seat support surface is supported by the seat frame to receive a seated occupant. A plurality of linear actuators is supported on the frame and oriented toward the seat support surface to each provide a localized percussive massage upon the seated occupant.

According to a further embodiment, at least one of the plurality of linear actuators is provided with a pneumatic actuator.

According to another further embodiment, at least one of the plurality of linear actuators is provided with a piston.

According to an even further embodiment, at least one of the plurality of linear actuators is further provided with a spring in cooperation with the piston to extend or retract the piston.

According to another further embodiment, a hydraulic cylinder is provided to actuate the piston.

According to an even further embodiment, a master hydraulic cylinder provides a pressurized source of fluid to the hydraulic cylinder.

According to another even further embodiment, a valve is in communication with the hydraulic cylinder and the master hydraulic cylinder.

According to another further embodiment, a compressor provides a source of pressurized air. A valve assembly is in communication with the compressor for receipt of the pressurized air, and in communication with the plurality of linear actuators to actuate the linear actuators. A controller is in communication with the valve assembly to control the actuation of the plurality of linear actuators.

According to an even further embodiment, the valve assembly cooperates with the plurality of linear actuators to extend the plurality of linear actuators toward the seat support surface.

According to another further embodiment, the valve assembly cooperates with the plurality of linear actuators to retract the plurality of linear actuators from the seat support surface.

According to another further embodiment, the valve assembly cooperates with the plurality of linear actuators to permit a pressure from the seated occupant to retract the plurality of linear actuators from the seat support surface.

According to another further embodiment, at least one of the plurality of linear actuators is provided with a solenoid.

According to an even further embodiment, the at least one of the plurality of linear actuators is further provided with a spring in cooperation with the solenoid to extend or retract a massage member.

According to another further embodiment, a controller is in communication with the plurality of linear actuators to control actuation of the plurality of linear actuators.

According to another further embodiment, at least one of the plurality of linear actuators is further provided with a massage node supported upon an extendable shaft.

According to an even further embodiment, the at least one of the plurality of linear actuators is further provided with a motor supported by the massage node or the extendable shaft. An eccentric weight is driven by the motor to extend and retract the extendable shaft and the massage node.

According to another embodiment, a seat assembly is provided with a seat frame. A seat support with a seat support surface is supported by the seat frame to receive a seated occupant. A camshaft is supported on the frame to provide a localized massage upon the seated occupant.

According to a further embodiment, at least one cam lobe on the camshaft increases in an outward radial dimension in a first rotary direction to a peak outward radial dimension after a first angular rotation. The at least one cam lobe on the camshaft increases in an outward radial dimension in a second rotary direction to the peak outward radial dimension after a second angular rotation that is less than the first angular rotation, to provide a gradual massage when rotated in the second rotary direction and to provide a more percussive massage when rotated in the first rotary direction.

According to another embodiment, a seat assembly is provided with a seat frame. A seat support with a seat support surface is supported by the seat frame to receive a seated occupant. A guide is supported upon the seat frame. A plurality of massage plates is provided on the guide. A plurality of massage nodes is each provided on one of the plurality of massage plates so that compression upon each massage plate flexes a region of each massage plate to extend each massage node forward to provide a localized massage upon the seated occupant.

According to another further embodiment, a plurality of motors is provide, and a plurality of cables are provided, each in cooperation with one of the plurality of motors and one of the plurality of massage plates so that operation of each motor extends or retracts each cable to flex or retract each massage plate.

BRIEF DESCRIPTION OF THE DRAWINGS

FIG. 1 is a front perspective view of a seat assembly according to an embodiment;

FIG. 2 is a top perspective view of an actuator of the seat assembly of FIG. 1;

FIG. 3 is a side elevation view of an actuator of the seat assembly of FIG. 1;

FIG. 4 is a side perspective view of a seat assembly according to another embodiment, illustrated with a camshaft;

DETAILED DESCRIPTION

Figure 5:
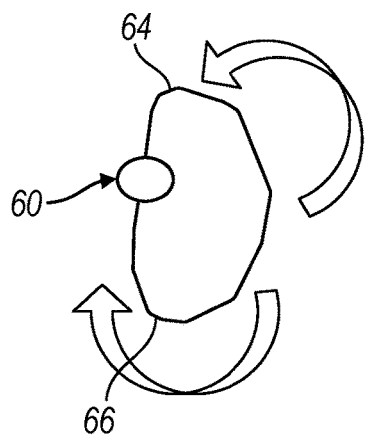
FIG. 5 is an axial end view of the camshaft of FIG. 4.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a seat assembly 20 according to an embodiment. The seat assembly 20 is a vehicle seat assembly 20 to seat an occupant within a land vehicle, aircraft, or watercraft. The seat assembly 20 includes a seat bottom assembly 22 to support a pelvis and thighs of an occupant. The seat bottom assembly 22 is adapted to be mounted to a vehicle floor. The seat assembly 20 also includes a seat back assembly 24 extending in an upright direction from the seat bottom assembly 22 to support a back of the occupant. The seat back assembly 24 includes a seat back frame 26 for providing structural support to the seat back assembly 24. A head restraint assembly 28 is connected to the seat back frame 26 and extends above the seat back assembly 24 to support a head of the occupant.

The seat back assembly 24 includes a cushion 30 to provide flexible and comfortable support to the occupant. The cushion 30 is provided on the seat back frame 26. A trim cover of the seat assembly 20 is omitted in FIG. 1 to illustrate the underlying components of the seat assembly 20. The cushion 30 provides a seat support with a seat support surface 32 to receive and contact the seated occupant.

The seat back assembly 24 includes a plurality of haptic devices 34 arranged in an array along the seat support surface 32. In the depicted embodiment, a plurality of receptacles 36 are provided in the cushion 30 to receive the plurality of haptic devices 34. The haptic devices 34 are employed to impart a massage effect upon the seat support surface 32 to deliver a massage effect to the seated occupant. The plurality of haptic devices 34 may be connected to the frame 26 to provide a resilient reaction force to the output massage effect.

With reference now to FIG. 2, one of the haptic devices 34 is illustrated as a pneumatic linear actuator 38. The linear actuator 38 includes a cylinder 40 with an inner chamber 42 for receipt of a pressurized fluid, such as pressurized air. A piston 44 is mounted for translation within the cylinder 40 and extends into the chamber 42. The pressurized air chamber 42 drives the piston 44 away from the chamber 42 in a direction toward the seat support surface 32 to provide a localized percussive massage upon the seated occupant, akin to a thumb pressure applied manually.

Referring now to FIG. 3, the piston 44 is illustrated extending out of the cylinder 40. A massage node 46 is mounted on a distal end of the piston 44 for translation with the piston 44 relative to the cylinder 40 to impart the percussive massage effect upon the occupant.

Referring again to FIG. 1, the seat assembly 20 may include a compressor 48 to provide a source of the pressurized air. A valve assembly 50 is in fluid communication with the compressor 48 and the plurality of linear actuators 34 to receive the pressurized air from the compressor 48 and to distribute the pressurized air to the plurality of linear actuators 34. A controller 52 is in communication with the valve assembly 50 to control the actuation of the plurality of actuators 34.

According to one embodiment, the valve assembly 50 pressurizes the linear actuators to extend the massage nodes 46. According to another embodiment, the valve assembly 50 may also pressurize the cylinders 40 in an opposite direction to retract the pistons 44 and massage nodes 46. Alternatively, the valve assembly 50 may exhaust the pressurized air from the cylinders 40 to permit a pressure from the seated occupant to retract the plurality of pistons 44.

With reference again to FIG. 3, the linear actuator 38 may include a tension spring 54 to retract the piston 44 and the massage node 46 after the pressurized air is exhausted from the cylinder 40. According to another embodiment, the spring 54 may be a compression spring 54 to extend the piston 44; and the pressurized air may drive the piston 44 to retract in the cylinder 40. The linear actuators 38 of FIGS. 1-3 provide a direct, concentrated percussive effect that is more concentrated and a higher intensity than prior art massage air bladders.

FIG. 4 illustrates a portion of a seat assembly 56 according to another embodiment. The seat assembly 56 includes a frame 58 that supports a camshaft 60 for rotation relative to the frame 58. A motor and transmission 62 are connected to the camshaft 60 to rotate the camshaft 60. The camshaft 60 includes a plurality of cam lobes 64 extending from the camshaft 60 so that rotation of the camshaft 60 imparts a localized massage effect upon the seat support surface 32. The camshaft 60 can be oriented horizontally in the seat assembly 56, in an upright direction, or at any suitable angle.

FIG. 5 illustrates an axial end view of the camshaft 60. One of the cam lobes 64 increases in an outward radial dimension from the camshaft 60 in a first rotary direction, which is clockwise in FIG. 5, and gradually increases to a peak outward radial dimension 66. The cam lobe 64 also increases in the outward radial dimension from the camshaft 60 in a second rotary direction, which is counterclockwise in FIG. 5, and abruptly increases to the peak outward radial dimension 66. Therefore, rotation of the camshaft 60 in the clockwise direction provides reaches the peak 66 after a short angular rotation to provide an abrupt percussion massage effect. In contrast, rotation of the camshaft 60 in the counterclockwise direction reaches the peak 66 after a longer angular rotation to provide a more gradual massage effect.

The rate of pressure of the massage effect is determined by a slope on the cam 64 and a direction of rotation of the camshaft 60. Various massage effects can be provided by varying the slope of the cam lobes 64, by varying a rotational direction of the camshaft 60, and by varying a speed of rotation of the camshaft 60. The seat assembly 56 provides a percussive massage effect, while omitting a compressor, a valve assembly, and hoses associated with pressurized systems.

Figure 6:
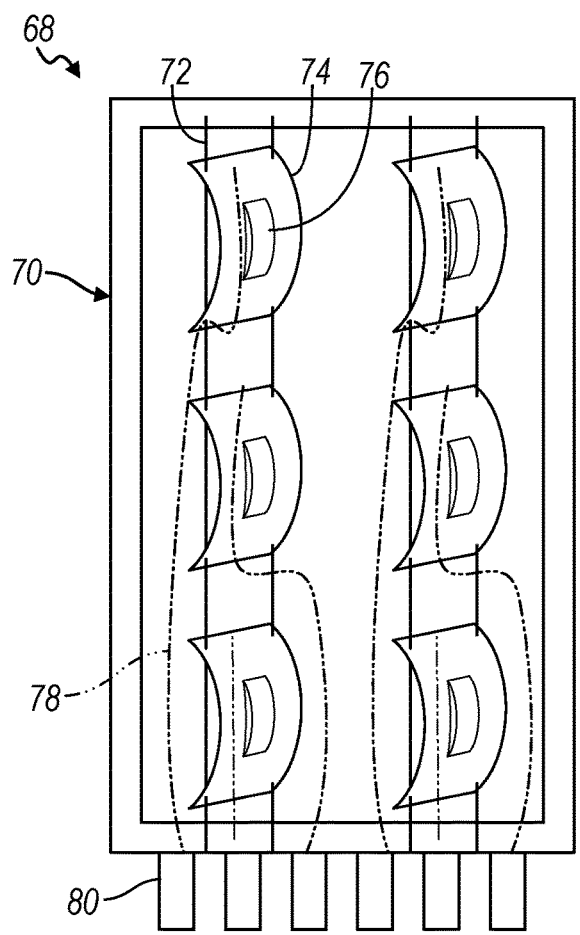
FIG. 6 is a front perspective view of a seat assembly according to another embodiment, illustrated with a plurality of massage plates.

FIG. 6 illustrates a seat assembly 68 according to another embodiment. The seat assembly 68 includes a frame 70. A plurality of guides 72 are installed upon the frame 70. For the depicted embodiment, the guides 72 are arranged in two pairs of guides 72. Each of the guides 72 may be formed from a metal wire. Each of the guides 72 may be installed directly upon the frame 70, or each may be supported upon a suspension that is connected to the frame 70.

A plurality of massage plates 74 are each supported upon a pair of the guides 72. Each massage plate 74 is formed of a flexible and resilient material, such as a steel alloy, a flexible polymer, a combination thereof, or the like. The massage plates 74 cooperate with the guides 72 such that a compression upon the plates 74 causes one end of the massage plate 74 to slide along the guides 72 so that the plate 74 flexes to extend or bow away from the guides 72. A massage node 76 is provided on each massage plate 74 to extend forward as the plate 74 bows outward, to provide a localized massage upon the seated occupant.

A plurality of cables 78 are provided, each in cooperation with one of the massage plates 74 to compress and flex the massage plates 74. The cables 78 are also each connected to a motor 80 to drive the cables 78. Operation of each motor 80 extends or retracts the corresponding cable 78, to flex or collapse each massage plate 74, to extend or retract each massage node 76. The massage plates 74 can also be adjusted in an upright direction along the guides 72 to adjust a massage location of the corresponding massage node 76. The seat assembly 68 provides a percussive massage effect, while omitting a compressor, a valve assembly, and hoses associated with pressurized systems.

Figure 7:
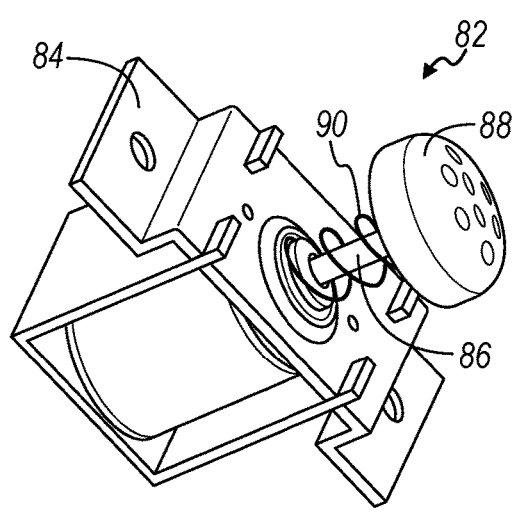
FIG. 7 is a side perspective view of an actuator according to another embodiment.

FIG. 7 illustrates a solenoid 82 as one of the linear actuators 34 of the seat assembly 20 of FIG. 1. The solenoid 82 includes a bracket 84 to attach to the seat frame 26 or to a suspension upon the seat frame 26. The solenoid 82 actuates a rod 86 with a massage node 88 to impart a percussive massage effect upon the occupant. The solenoid 82 is in electrical communication with the controller 52 for actuation of the solenoid 82.

The solenoid 82 may include a tension spring 90 to retract the rod 86 and the massage node 88 when the solenoid 82 is deactivated. According to another embodiment, the spring 90 may be a compression spring 90 to extend the rod 86; and the charged solenoid 82 may drive the rod 86 to retract in the solenoid 82. The linear actuator 82 provides a direct, concentrated percussive effect that is more concentrated with a higher intensity than prior art massage air bladders. The solenoid 82 provides a percussive massage effect, while omitting a compressor, a valve assembly, and hoses associated with pressurized systems.

Referring again to FIGS. 1-3, the controller 52 may reverse the fluid directions of the valve assembly 50 to oscillate the massage node 46 provide a linear vibratory massage effect.

Figure 8:
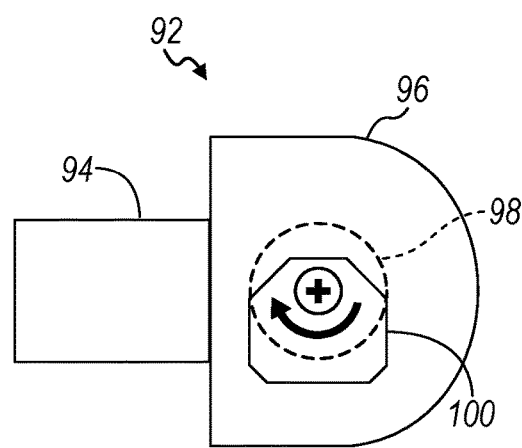
FIG. 8 is a side elevation view of an actuator according to another embodiment.

FIG. 8 illustrates a vibratory massage assembly 92 according to another embodiment. The massage assembly 92 includes a rod 94, which may be mounted for translation upon the seat back frame 26. A massage node 96 is installed on a distal end of the rod 94. A motor 98 is supported in the massage node 96. The motor 98 drives an eccentric weight 100 for rotation about an output of the motor 98. The offset mass of the weight 100 imparts a cyclical vibration to the motor 98, and consequently to the massage node 96 and the shaft 94. The cyclical vibration causes the node 96 and the shaft 94 to vibrate linearly to provide a linear vibration massage effect. The vibratory massage assembly 92 provides a percussive massage effect, while omitting a compressor, a valve assembly, and hoses associated with pressurized systems.

Figure 9:
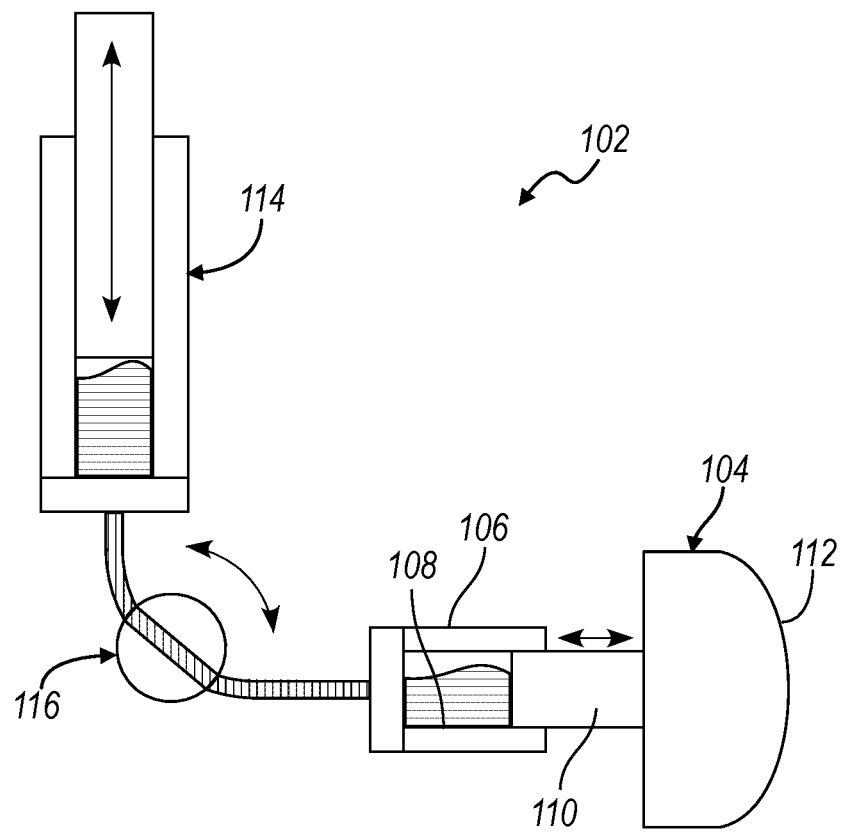
FIG. 9 is a side elevation view of a massage system according to another embodiment.

FIG. 9 illustrates a massage assembly 102 according to another embodiment. The massage assembly 102 includes another linear actuator 104 to impart a massage effect upon the seat support surface 32 to deliver a massage effect to the seated occupant. A plurality of the massage assemblies 102 may be connected to the frame 26 to provide a resilient reaction force to the output massage effect.

According to an embodiment, the linear actuator 104 is illustrated as a hydraulic linear actuator 104. The linear actuator 104 includes a cylinder 106 with an inner chamber 108 for receipt of a pressurized fluid, such as hydraulic fluid. A piston 110 is mounted for translation within the cylinder 106 and extends into the chamber 108. The pressurized fluid in the chamber 108 drives the piston 110 away from the chamber 108 in a direction toward the seat support surface 32 to provide a localized percussive massage upon the seated occupant.

The piston 110 is illustrated extending out of the cylinder 106. A massage node 112 is mounted on a distal end of the piston 110 for translation with the piston 110 relative to the cylinder 106 to impart the percussive massage effect upon the occupant.

The massage assembly 102 includes a master hydraulic cylinder 114 to pressurize the hydraulic fluid. A valve 116 is in fluid communication with the master hydraulic cylinder 114 and the hydraulic linear actuator 104 to convey the hydraulic fluid from the master hydraulic cylinder 114 to the hydraulic linear actuator 104. The controller 52 is in communication with the valve 116 to control the actuation of the hydraulic linear actuator 104. The master cylinder 114 can be retracted to retract the fluid, and consequently to retract the piston 110 and the massage node 112.

Air is compressible while hydraulic fluid is not compressible. The hydraulic massage assembly 102 provides one to one force upon actuation without pressure loss or hysteresis associated with pneumatics.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly, comprising:
    a seat frame;
    a seat support with a seat occupant support surface supported by the seat frame; and
    a plurality of linear actuators supported on the seat frame and oriented toward the seat occupant support surface, wherein each linear actuator is actuatable in response to a massage request, wherein each linear actuator is connected to the seat frame and adds a resilient reaction force to a massage output force, and wherein at least one of the plurality of linear actuators comprises a piston and a spring in cooperation with the piston to bias the piston to an extended position or a retracted position.

2. The seat assembly of claim 1, wherein the at least one of the plurality of linear actuators comprises a pneumatic actuator, and wherein each pneumatic actuator is separately connected to the seat frame.

3. The seat assembly of claim 1, wherein the piston is received within a cylinder having a fluid chamber, and wherein the piston is moveable into and out of the cylinder in response to pressure changes in the fluid chamber.

4. The seat assembly of claim 3 further comprising a hydraulic cylinder to actuate the piston.

5. The seat assembly of claim 4 further comprising a master hydraulic cylinder to provide a pressurized source of fluid to the hydraulic cylinder.

6. The seat assembly of claim 5 further comprising a valve in communication with the hydraulic cylinder and the master hydraulic cylinder.

7. The seat assembly of claim 1, further comprising:
    a compressor;
    a valve assembly having an input receiving pressurized air from the compressor and an output communicating the pressurized air to the plurality of linear actuators; and one or more controllers that selectively actuate the plurality of linear actuators via the valve assembly.

8. The seat assembly of claim 7, wherein the valve assembly cooperates with the plurality of linear actuators and moves the plurality of linear actuators to an extended position toward the seat occupant support surface in response to receiving the pressurized air.

9. The seat assembly of claim 7, wherein the valve assembly cooperates with the plurality of linear actuators and moves the plurality of linear actuators to a retracted position from the seat support surface in response to releasing the pressurized air.

10. The seat assembly of claim 7, wherein the valve assembly cooperates with the plurality of linear actuators and exhausts the pressured air from a plurality of cylinders to permit a seat occupant pressure on the seat support to retract the plurality of linear actuators from the seat occupant support surface.

11. The seat assembly of claim 1, wherein the at least one of the plurality of linear actuators further comprises a massage node supported upon an extendable shaft.

12. A seat assembly, comprising:
a seat frame;
a seat support structure supported by the seat frame and having a seat occupant support surface; and
a plurality of linear actuators that are each separately connected to the seat frame, wherein each linear actuator is actuatable in response to a massage request, and wherein at least one of the plurality of linear actuators comprises a piston and a spring in cooperation with the piston to bias the piston to an extended position or a retracted position.

13. The seat assembly of claim 12, wherein each linear actuator adds a resilient reaction force to a massage output force.

14. The seat assembly of claim 12, wherein each linear actuator comprises a cylinder with an inner fluid chamber, and wherein the piston is moveable along a linear path into and out of the cylinder in response to pressure changes within the inner fluid chamber.

15. The seat assembly of claim 14, including at least one massage node on a distal end of the piston, the at least one massage node being moveable with the piston relative to the cylinder.

* * * * *